Figure 1:
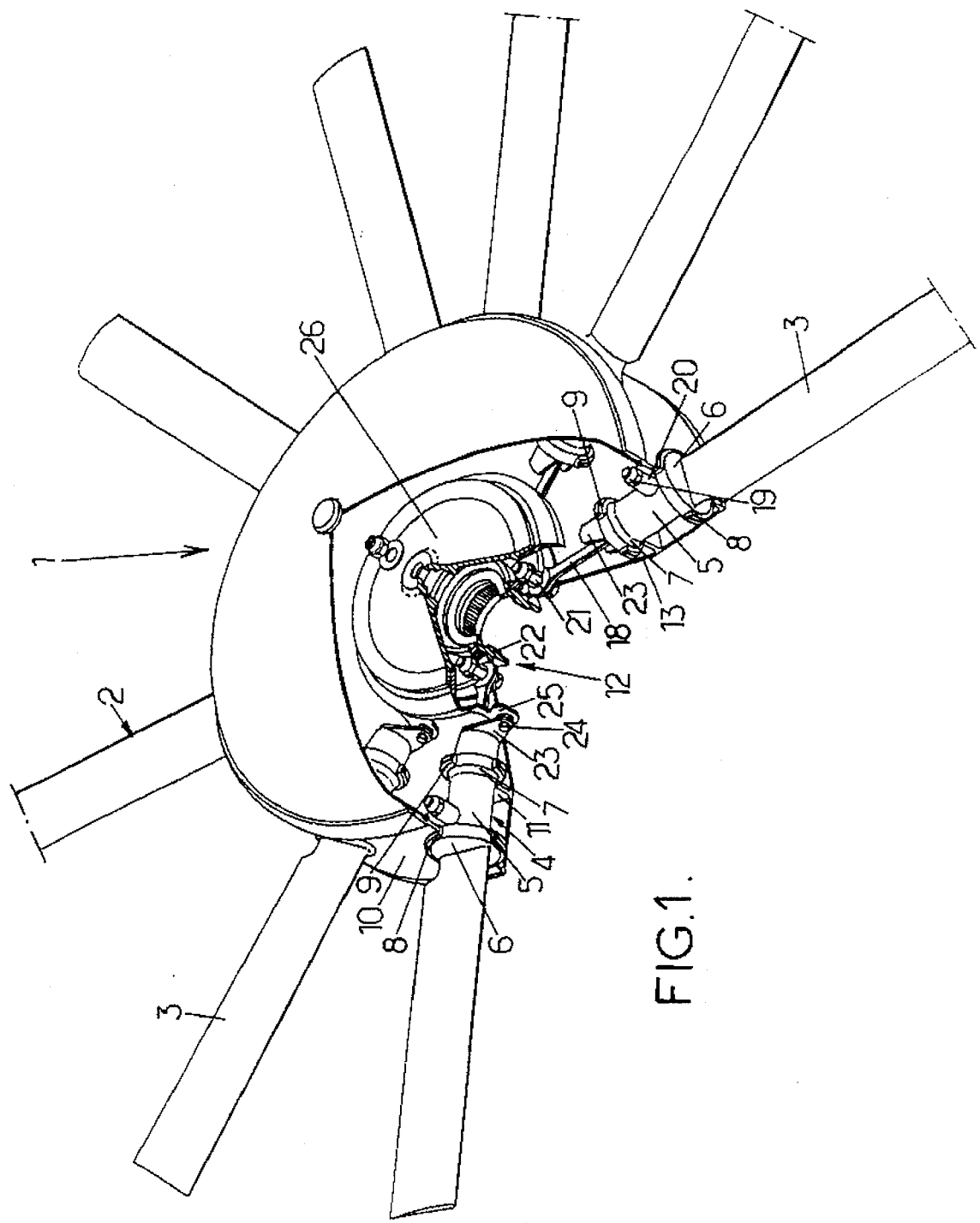

United States Patent [19]

Monvaillier et al.

[11] Patent Number: 5,542,818
[45] Date of Patent: Aug. 6, 1996

[54] DUCTED ANTI-TORQUE ROTOR WITH FLOATING BLADES

[75] Inventors: Jérome M. Monvaillier, Aix-en-Provence; Jacques J. Polveda, Aubagne, both of France

[73] Assignee: Eurocopter France, Marignane Cedex, France

[21] Appl. No.: 298,317

[22] Filed: Sep. 1, 1994

[30] Foreign Application Priority Data

May 4, 1994 [FR] France ................................. 94 05482

[51] Int. Cl.⁶ .................................................. B64C 27/48
[52] U.S. Cl. .......:.......................... 416/134 A; 416/168 R
[58] Field of Search ........................... 416/134 A, 144, 416/160 R, 163

[56] References Cited

U.S. PATENT DOCUMENTS

| | | | |
|---|---|---|---|
| 3,594,097 | 7/1971 | Mouille et al. | |
| 4,439,106 | 3/1984 | Ferris et al. | 416/134 A |
| 4,626,172 | 12/1986 | Mouille . | |
| 4,626,173 | 12/1986 | Mouille et al. | |
| 4,639,284 | 1/1987 | Mouille . | |
| 4,815,937 | 3/1989 | Aubry et al. | 416/134 A |
| 5,156,527 | 10/1992 | Pancotti | 416/134 A |
| 5,297,934 | 3/1994 | Desjardins | 416/164 |
| 5,306,119 | 4/1994 | Bandoh et al. | 416/168 R |
| 5,383,767 | 1/1995 | Aubry | 416/134 A |
| 5,415,525 | 5/1995 | Desjardins et al. | 416/164 |

FOREIGN PATENT DOCUMENTS

| | | |
|---|---|---|
| 562527 | 9/1993 | European Pat. Off. . |
| 1531536 | 5/1968 | France . |

OTHER PUBLICATIONS

Proceedings of the nineteenth european rotorcraft forum, 14 Sep. 1993, CERNOBBIO: "A new generation of fenestron fan-in-fin tail rotor on EC 135".

*Primary Examiner*—Edward K. Look
*Assistant Examiner*—Mark Sgantzos
*Attorney, Agent, or Firm*—Larson and Taylor

[57] ABSTRACT

In the rotor, the pitch lever of each blade is connected to the tab of the pitch control spider by a ball joint mounted on a wrist pin and received with clearance in an oblong opening in a ring. The axially offset bearing surfaces of the cuff of the blade are mounted with a radial clearance in the bearings of the hub on which they swivel about the pitch axis of the blade. These radial clearances enable contacts of the ball joint against the edge of the opening on the side of the ends of its minor axis, but prevent these contacts on the side of the ends of the major axis of the oblong opening.

12 Claims, 5 Drawing Sheets

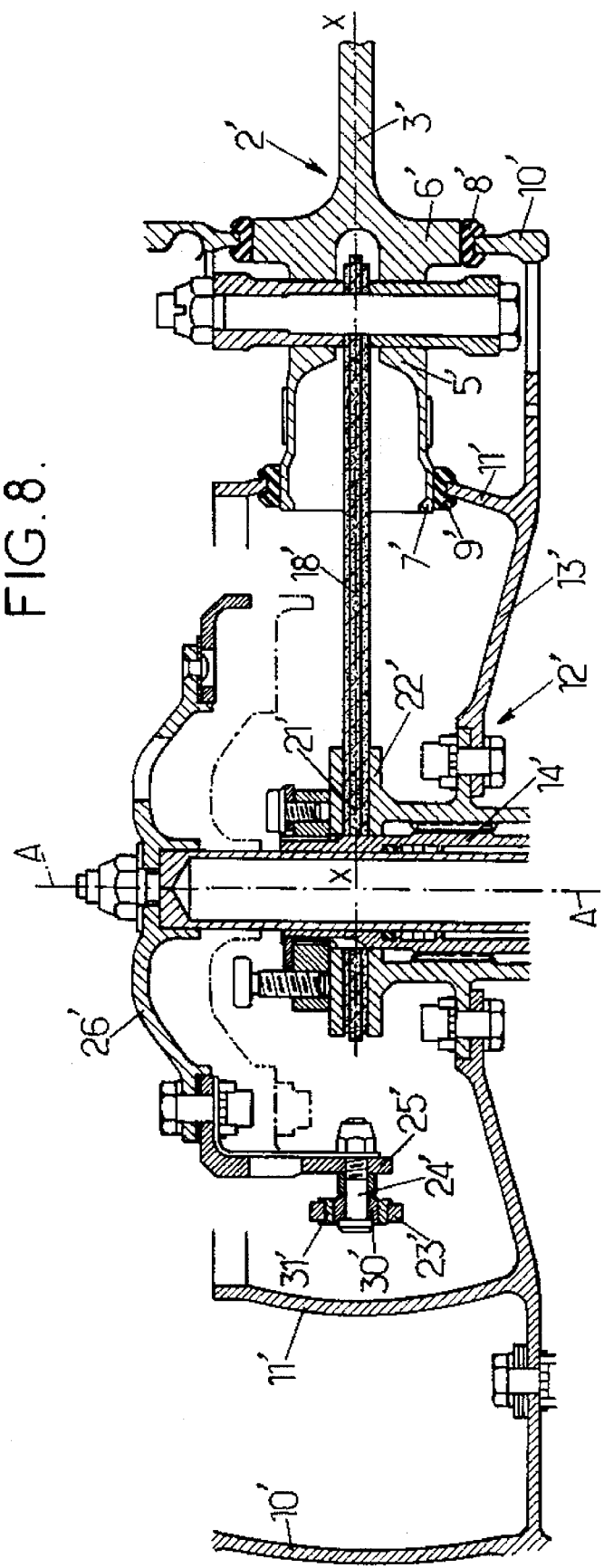

DUCTED ANTI-TORQUE ROTOR WITH FLOATING BLADES

The invention relates to a variable-pitch multi-blade rotor for a rotary-wing aircraft ducted anti-torque device, particularly for a helicopter, and in which each blade is mounted so that it floats at rest on the hub of the rotor.

In order to equip helicopter ducted anti-torque devices, variable-pitch multi-blade rotors are already known comprising:

a rotor shaft, mounted so that it rotates about an axis of the rotor, a hub, rotationally secured to the rotor shaft, blades, each of which is connected to the hub by a footing part comprising at least one flexible arm which can be twisted about the longitudinal pitch change axis of the blade, and which is partially housed in a blade root cuff, the cuff exhibiting two coaxial bearing surfaces spaced apart along the axis of the blade, via which it is mounted so that it swivels about the axis of the blade in two bearings of the hub, as well as a pitch lever, which is off-centered with respect to the axis of the blade, and a spider for collective control of the pitch of the blades, which is rotationally driven with the hub and can be given a translational movement along the axis of the rotor by means of a control rod, the spider exhibiting, for each blade, a pitch control tab extending substantially along the axis of the rotor, and articulated to the pitch lever of the corresponding blade by means of a wrist pin with ball joint, so that any axial displacement of the spider with respect to the hub gives rise, via the action of the tab on the pitch lever, to a rotation of the blade about its pitch axis.

Rotors of this type are particularly described in the French Patent FR 1 531 536 and the American Patents U.S. Pat. No. 3,594,097 and U.S. Pat. No. 4,626,173.

In these known rotors, the pitch control loadings transmitted to the pitch levers by the spider and the control rod are applied with the aid of a hydraulic servo-control unit. In effect, these control loadings are relatively significant, bearing in mind the statically indeterminate way in which the blades are mounted on the hub of the rotor. This statically indeterminate mounting or hyperstatic mounting results from the fact that the bearing surfaces of the cuff of the root of each blade are mounted practically without clearance in the bearings of the hub, as well as from the fact that the control of pitch is performed by an annular linear link of the ball joint of the articulation of the pitch lever to the corresponding tab of the control spider which is practically without clearance. To this is added the significance of the inertial loadings resulting from the blade, the uptake of centrifugal force and the limitation of the rotation about the pitch axis by the torsion arm of each blade.

In effect, the control loadings which have to be produced are intended to overcome not only the static moments applied to each blade, for a given pitch position, but also the moments resulting from transient loadings, which are developed when passing from one pitch position to another, by means of an action of the pilot on the rudder bar.

In statics, for a given pitch position, it is known that the moment exerted by the control loading applied to the pitch lever at a point which is off-centered from the pitch axis, and about this pitch axis, is equal to the moment resulting from the other moments applied to the blade. The calculation of the static control load therefore relies on the moment balance equation about the pitch axis. Among these other moments applied to the blade, the main ones are the elastic return moment coming from the torsion arm, the "return to neutral" moment, the moment of lift or aerodynamic moment, the generally negative angle of attack moment of the profile, due to the camber of this profile, as well as the moment of centrifugal force.

It is known that the return moment of the torsion arm is due to its torsional stiffness and takes account of the possible angular preset of the torsion arm with respect to the neutral pitch of a reference section of the blade, which is generally twisted.

The "return to neutral" moment is the moment resulting from centrifugal force exerted on each blade element of a rotating rotor and having the effect of opposing any variation in the overall pitch, and of returning the blades to the plane of rotation, It is known that this moment depends on the distribution of the mass inertia of the whole of the blade (profiled main blade section and cuff) about its pitch axis. As this moment is, in particular, responsible for the control loadings which are to be provided on a tail rotor, it is known, to reduce this moment, and therefore reduce the control loadings to be provided, how to reduce this mass inertia with respect to the pitch axis by adding compensating weights, termed "tuning weights", substantially perpendicularly to the main inertia axis of the blade.

The moment of lift is due to the fact that the point of action of the aerodynamic force applied to a blade is situated away from the pitch axis. Finally, the moment of centrifugal force is due to the fact that the latter is exerted on the blade, the center of gravity of which is, on the chord, at a certain distance from the pitch axis, the conicity of the blade tending to create a component of centrifugal force which is normal to the plane of the rotor and which, combined with this distance, creates a moment about the pitch axis.

With the static control loadings thus being determined from the balance of the abovementioned static moments, it is appropriate to consider the transitory control loadings, that is to say the control loadings which, over and above the aforementioned static moments, make it possible to overcome in particular the frictional moment about the pitch axis generated by the reactions of the bearings of the hub on the bearing surfaces of the cuff of each blade. These reactions arise, on the one hand, from the uptake of the flap and drag moments, and from centrifugal force as a function of the flapping and drag, and, on the other hand, from the uptake of the control loading. However, the control loading depends on the value of the reactions of the bearings, which themselves depend on the value of the control loading. In effect, in the statically indeterminate mountings of the blades of the rotors of the aforementioned state of the art, any control loading is manifested in reactions at the bearings giving rise to an increase in the friction, which could lead to a certain binding which the pilot has to overcome by increasing the control loading, and therefore also the reaction at the bearings, therefore the friction, which results in a risk of jamming. This binding, the intensity of which increases with that of the control force, does not arise on the known rotors precisely owing to the presence of the hydraulic servo-controlled unit which provides a significant control loading. However, this servo-controlled unit, together with its hydraulic circuit, constitutes a relatively expensive component with a significant mass practically at the end of the tail part of the helicopter.

The problem at the root of the invention is to propose improvements to the known rotors of the aforementioned type so as to reduce the control loadings necessary for maintaining and changing the pitch of the blades, without compromising safety, accuracy, and flying comfort, and eliminating the servo-control unit and the associated hydraulic circuit in order to obtain a more lightweight rotor with a lower manufacture and maintenance cost.

Another object of the invention is to propose a rotor of the aforementioned type, in which the control loadings are reduced to approximately 1/10 of that which they are in known rotors, the static control loading being very low, to give good flying comfort to a pilot maintaining a pitch, and the transient control loading necessary to change from one pitch position to another by action on a pedal of the rudder bar being greater than the static control loading but within a reasonable envelope to ensure stability of flying and good responsiveness, without risk of the phenomenon termed "overshoot", consisting in displacing one pedal of the rudder bar by too great an amplitude, requiring corrective compensation on the other pedal.

To this end, the rotor according to the invention, of the aforementioned type, is one wherein the ball joint is carried by one of the two elements which are the lever and the tab, and is engaged in an oblong opening in a ring carried by the other of the two elements, with clearance along each of the major and minor axes of the oblong opening, the clearance along the minor axis, substantially parallel to the axis of the rotor, being less than the clearance along the major axis, perpendicular to the minor axis and transversal to the axis of the blade, and each bearing surface of the cuff is mounted in the corresponding bearing of the hub with a clearance allowing the ball joint to bear against the internal lateral face of the oblong opening on the side of the ends of the minor axis but such that the ball joint cannot come to bear against the internal lateral face of the oblong opening on the side of the ends of the major axis.

A statically determinate mounting or isostatic mounting of the blade is thus obtained, the two bearings behaving substantially like a single bearing, with clearances at the bearings which allow the various parasitic reactions at the bearings and on the pitch ball joint to be reduced, or even eliminated, which parasitic reactions are generated, in the rotors of the state of the art, by the statically indeterminate mounting of the blades. This reduction in the reactions obtained on a rotor according to the invention therefore has the effect of limiting the frictional moment.

The clearances at the bearings also permit significant excursions in terms of drag and flapping without overloading either the blades or the control chain. This increase in the excursions enables the values of the reactions at the bearings to be reduced still further. In effect, combined with the centrifugal force on the blades, these excursions give rise to moments which have the benefit of countering the moments generated by lift and drag.

However, the limitation of the clearances at the bearings as proposed by the invention makes it possible not to produce other drawbacks, which would result from too great an increase in the clearances, such as an increase in dynamic excursions at the pitch control ball joint, risk of dynamic impacts on the bearings, and possible instability of the blade.

The statically determinate mounting of the invention makes it possible not only to avoid setting rolling-contact bearings, which pose problems of overall space requirement and mass, at the bearings where the blade cuffs rotate on the hub, but also to reduce the stresses in the pitch control, which stresses may moreover be amplified in known rotors owing to the fact that the pitch control takes place with the aid of a rigid control spider. In effect, in the absence of clearance and in the presence of defect (discrepancy in the positions of the blades with respect to each other), the control spider is stressed. The clearances with which the ball joint is received in the oblong opening of the link of the pitch lever to the control spider of the invention precisely make it possible to reduce the loadings, on the one hand, due to friction at the pitch lever and, on the other hand, the stressing of the control spider.

For this purpose, it is advantageous that for each blade, the ball joint should come to bear flat with sliding point contact against the internal lateral face of the corresponding oblong opening.

In an advantageously simple embodiment for obtaining an angular excursion of the blade in flap (along the minor axis of the opening) and in drag (along the major axis of the opening) making it possible to obtain a significant reduction in the transient control loadings, the oblong opening exhibits two opposed flats parallel to its major axis and which are symmetric with respect to its center, and is formed in a ring inserted and fastened into a housing in the element which carries it and held by a shoulder against an edge of the said housing, and on which shoulder there are formed two flats parallel to the major axis of the oblong opening.

Furthermore, the invention proposes to choose the points of application of the control loadings in order to determine the directions of the reactions at the bearings so as to unload the two bearings. For this purpose, the reactions at the bearings resulting from the control loadings are, according to the invention, of opposite signs to the reactions at the bearings due to the uptake of the flapping moments. In order to obtain this result, it is advantageous that, for each blade, the cuff should carry the pitch lever radially on the outside of the bearing surfaces toward the axis of the rotor and projecting toward the leading edge of the blade. However, the same advantageous result may be obtained if, for each blade, the cuff carries the pitch lever radially on the outside and close to the bearing surface in a radially external position with respect to the axis of the rotor, and projecting toward the trailing edge of the blade, or again, if, for each blade, the pitch lever carried by the cuff between its two bearing surfaces projects toward the leading edge of the blade when it is closer to the radially internal bearing surface than to the other bearing surface or, on the contrary, projects toward the trailing edge of the blade when it is closer to the radially external bearing surface.

In addition to the provisions hereinabove which make it possible, according to the invention, to reduce the transient control loadings, supplementary provisions make it possible to reduce the static control loadings. For this purpose, when each twistable and flexible arm is linked to the corresponding blade, while being held in the corresponding cuff on the side of its radially external end with respect to the axis of the rotor, by at least one fastening pin which can float with respect to the cuff, in a direction substantially parallel to the axis of the rotor, this fastening pin is an elongate pin of large size, substantially parallel to the axis of the rotor so as to give a tuning-weight effect.

Furthermore, or as an alternative, in this case, the pin may simultaneously fasten at least one separate tuning weight to the cuff.

In a preferred embodiment, the tuning weight comprises a bushing engaging in a transverse bore of the cuff and secured to a collar bearing against a lateral face of the cuff and exhibiting at least one polarizing key for positioning it on the cuff, the collar bearing, on the opposite side from the bushing, a counterweight which is substantially inclined toward the leading edge and toward the upper side of the suction face or toward the trailing edge and toward the underside of the pressure face of the blade, depending on whether the tuning weight is fastened respectively on the suction face side or on the pressure face side of the blade, which makes it possible to favorably orientate the distribution of the inertia of the blade about its pitch axis in order to obtain a zero or even negative "return to neutral" moment in order to reverse the return to neutral.

Figure 2:
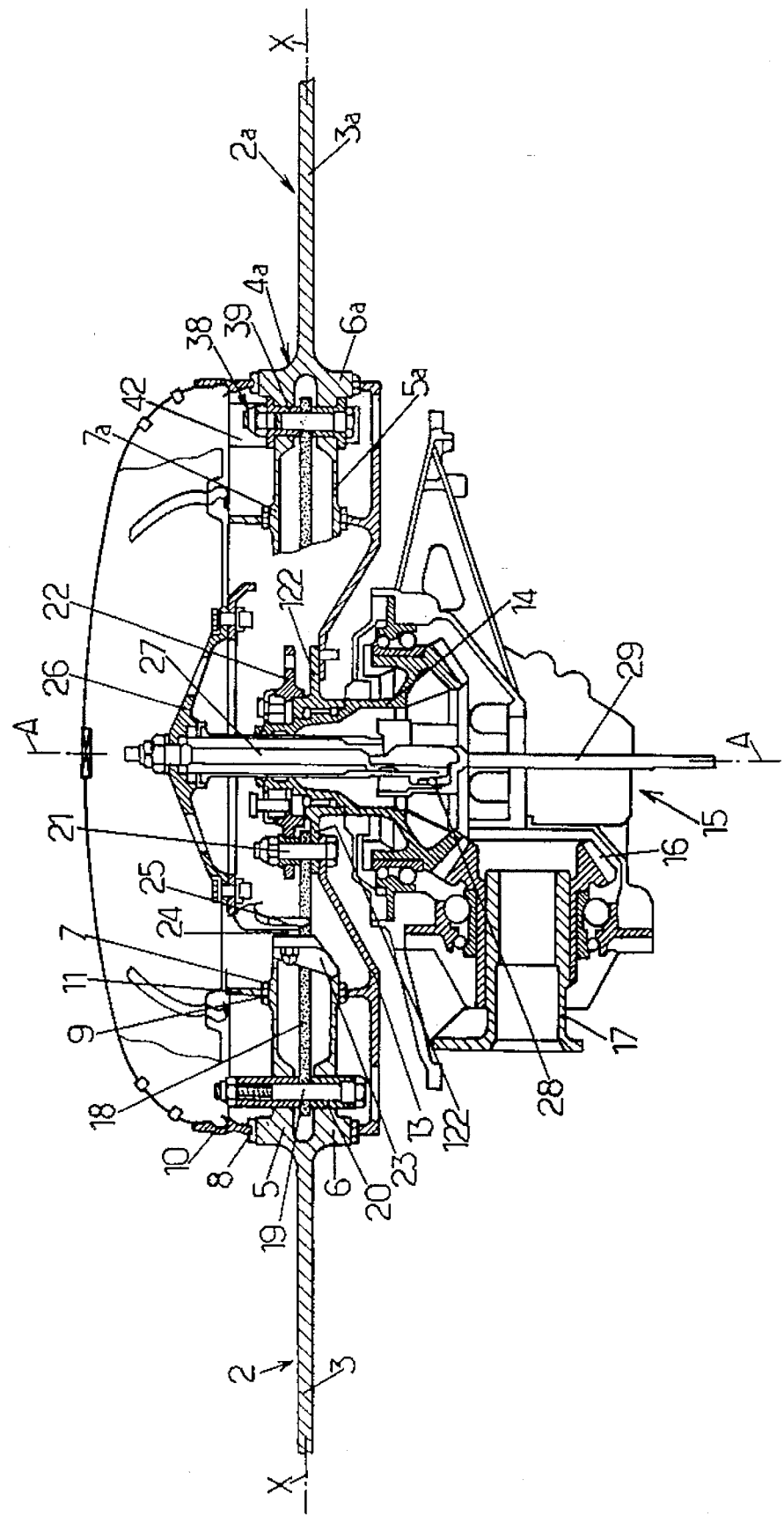
Figure 3:
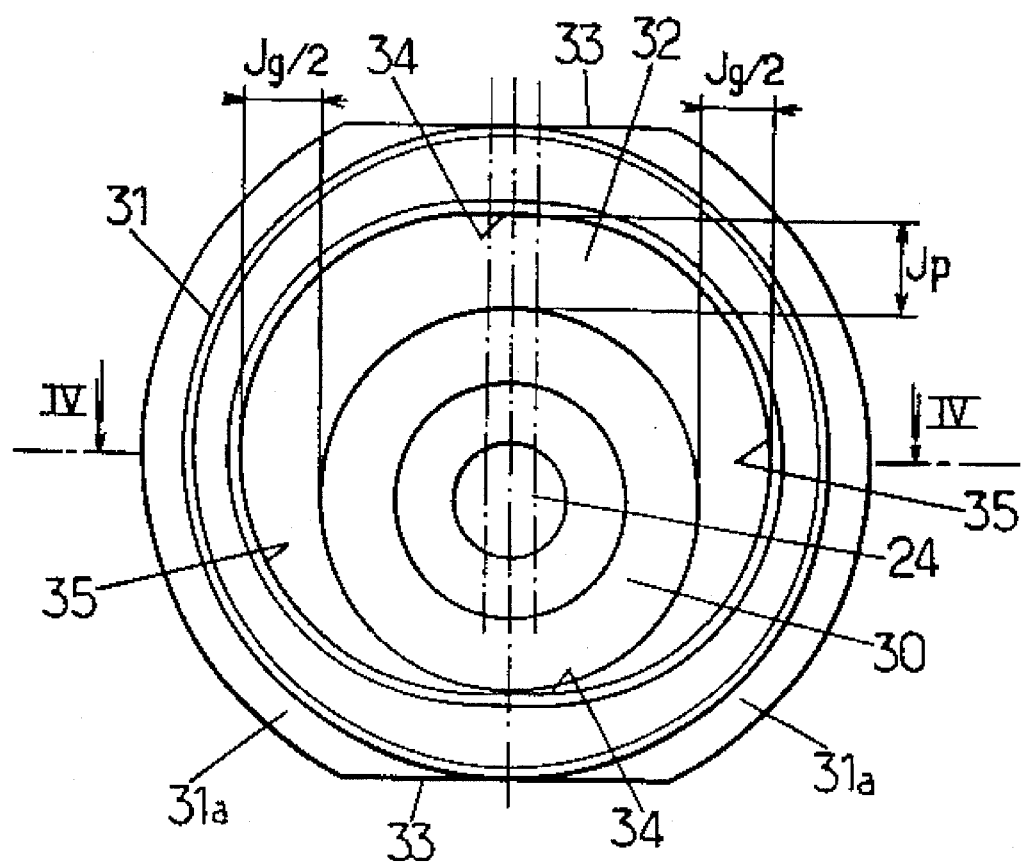
Figure 4:
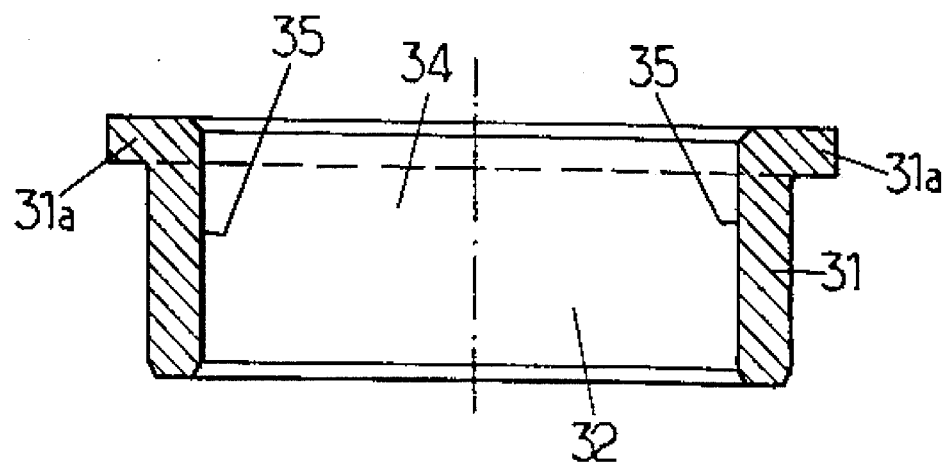
Figure 5:
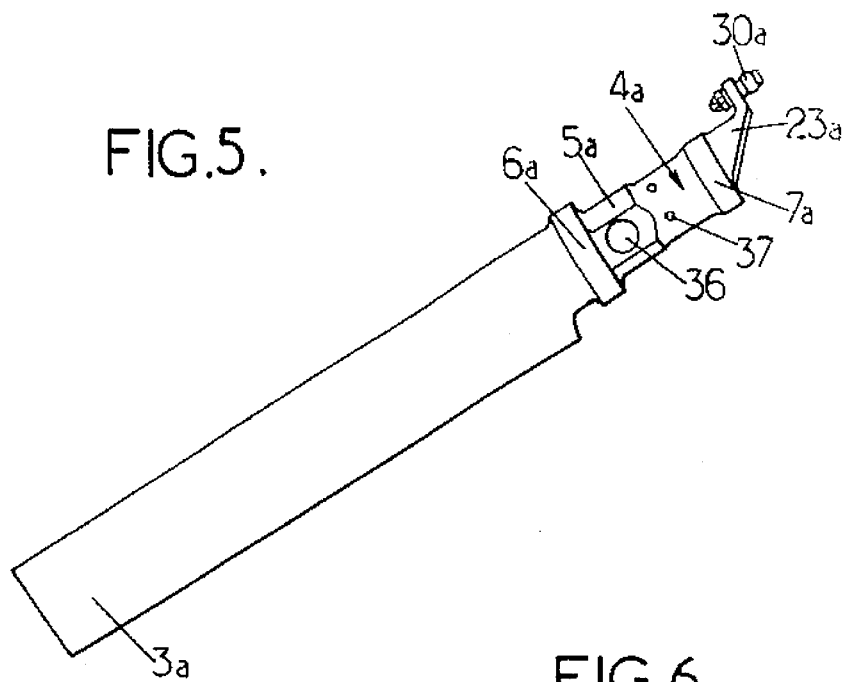
Figure 6:
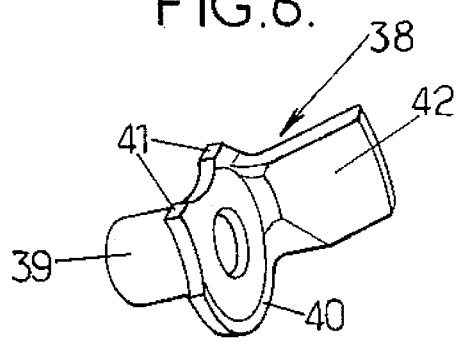
Figure 7:
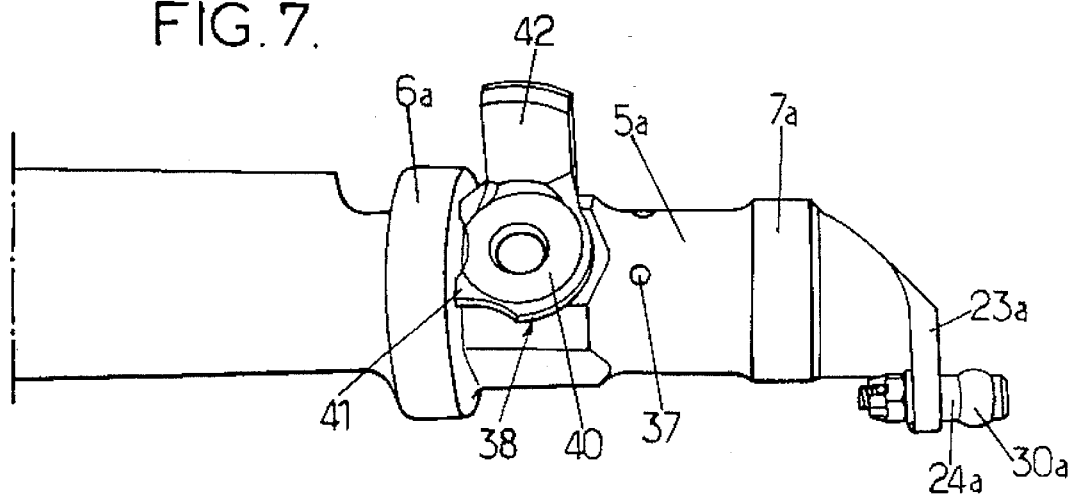

Other characteristics and advantages of the invention will stem from the description given hereinbelow, with no limitation being implied, of embodiment examples described with reference to the appended drawings in which:

FIG. 1 is a perspective view with partial cutaway and partial sections of a rotor represented without its rotational-drive means or control rod, FIG. 2 is a diametral section through the rotor with its rotational-drive and pitch control means, the left-hand half-section corresponding to FIG. 1, and the right-hand half-section to a variant equipped with blades according to FIGS. 5 to 7, FIG. 3 is a side elevation of a ring for articulating a pitch lever to the control spider of the rotor of FIGS. 1 and 2, FIG. 4 is a section on IV—IV of FIG. 3, FIG. 5 is a perspective view of a blade variant for equipping the rotor of FIGS. 1 and 2, FIG. 6 is a perspective view of a tuning-weight variant for the blade of FIG. 5, FIG. 7 is a perspective view of the root of the blade of FIG. 5 equipped with the tuning weight of FIG. 6, and FIG. 8 is a partial section, similar to FIG. 2, of a rotor variant.

The rotor described hereinbelow with reference to FIGS. 1 and 2 exhibits an architecture, rotational-drive means and means for collective control of the pitch of the blades which are very similar, if not identical, to those of the rotors described in the American Patents U.S. Pat. No. 3,594,097 and U.S. Pat. No. 4,626,173, to which reference will be made for further details, and of which the description relating to the abovementioned objects is incorporated into the present descriptive text by way of references.

The multi-blade rotor denoted overall by 1 in FIG. 1 is, in a way which is well known, intended to be mounted in a ducted shroud formed transversely in the vertical rear part of a helicopter, as represented in FIG. 1 of the two abovementioned patents.

In the example of FIGS. 1 and 2, this rotor comprises ten blades 2, each of which includes a profiled main blade section 3 with aerodynamic profile, as well as a blade root 4. The latter comprises a cuff 5 made of metal, of lightweight alloy, in a single piece with the profiled part 3, as well as two coaxial bearing surfaces 6 and 7 around the longitudinal pitch change axis X—X of the blade, and of cylindrical shape, these two bearing surfaces 6 and 7 further being separated from one another along the pitch axis X—X. By means of its bearing surfaces 6 and 7 the cuff 5 is mounted so as to swivel about the pitch axis X—X in two coaxial bearings 8 and 9 each mounted in respectively one of two walls 10 and 11 of a hub body 13 of a hub referenced overall as 12.

This hub 12 is rotationally driven about the axis A—A of the rotor by a rotor shaft 14, mounted so that it rotates about the axis A—A in a rear transmission box referenced overall by the reference 15, and not described in detail because it has a known structure. It is sufficient to recall that this rear transmission box 15 comprises a bevel gearing 16 rotationally driven by a transmission shaft 17 connected to an output of the main transmission box of the helicopter, the bevel gearing 16 being in engagement with a crown wheel at the base of the rotor shaft 14.

The blade 2 is connected to the hub 12 by a footing part made up of an arm 18 which is flexible and can be twisted about the pitch axis of the blade. As in the rotor described in French Patent FR 1 531 536, this torsion arm 18, capable of holding the blade 2 against the centrifugal force which urges it when the rotor is rotating, is made up of a bundle of stacked metal strips which are thin, of slight width and as long as possible, bearing in mind the overall size of the rotor, to give a low torsional stiffness. The bundle of the stacked strips of the arm 18 is retained, at its radially external end with respect to the rotor axis A—A, by a pin 19 which floats, that is to say with a desired clearance, with respect to the cuff 5, and parallel to the axis A—A of the rotor in order to avoid additional stresses, by contact between the cuff 5 and the bundle 18, in any configuration of the blade, the pin 19 passing through two elongate spacer pieces 20 substantially end to end parallel to the rotor axis A—A, and housed in opposing holes in the end of the bundle 18 and in overly thick parts of the cuff 5, between them forming two flats between which this radially external end of the arm 18 is located. At its radially internal end (with respect to the rotor axis A—A), this arm 18 is retained on the hub 12 by a pin 21 parallel to the rotor axis A—A and fastening it between two superimposed central parts of a splined flange 22 and of a ring 122 which are rotationally secured by axial splines to the rotor shaft 14. In addition, the pins 21 simultaneously fasten the splined flange 22 onto the hub body 13, in order to secure the assembly in terms of rotation about the rotor axis A—A. Thus, each torsion arm 18 has its radially external part housed in the cuff 5 of the corresponding blade root 4, being torsionally secured to the latter about the pitch axis of the blade, whereas its radially internal part, leaving the cuff 5, is set into the splined flange 22.

In order to control the pitch of the blades 2, the cuff 5 of each of them has a pitch lever 23, of which the end, off-centered with respect to the pitch axis X—X of the blade, supports a bolted wrist pin 24 supporting a ball joint 30 received in an opening 32 in a ring 31 (see FIG. 3) carried by a pitch control tab 25 substantially parallel to the rotor axis A—A and secured to a control spider 26 including as many tabs 25 as the rotor has blades 2. This control spider 26 is rotationally secured to a central control rod 27 passing coaxially (with respect to the rotor axis A—A) through the tubular rotor shaft 14 and mounted so that it can move axially within the latter, the base of the central control rod 27 interacting, by means of a thrust ball bearing 28, with a pitch control rod 29 which cannot rotate but is displaced axially along the rotor axis A—A by operating the rudder bar, without intermediary of a servo valve. Thus, the rod 27 and the control spider 26 may be given a translational movement along the rotor axis A—A, rotating with the hub 12 and the blades 2. In doing so, the control tabs 25 of the spider 26 drive the pitch levers 23 by means of the ball joints 30 which articulate them to one another in terms of rotation about the pitch axes, counter to the linking arms 18, which are deformed in torsion.

In a way which is specific to the invention, and as visible more precisely in FIGS. 3 and 4, the ball joint 30 mounted on the wrist pin 24 fixed to the end of the pitch lever 23 is received in an oblong opening 32 of the ring 31, fitted tightly from inside to outside and fastened, for example by bonding, into a housing of corresponding shape formed in the tab 25 of the control spider 26, being retained against the edge of the housing by a shoulder 31a projecting externally from the sides corresponding to the ends of the major axis of its oblong opening 32. The shoulder 31a has two symmetric flats 33 parallel to the major axes of the oblong opening 32.

The ball joint 30 is received in the oblong opening 32 with both a clearance Jp along its minor axis and a clearance Jg along its major axis (the sum of the two clearances Jg/2 depicted on respective sides of the minor axis). The clearance Jp along the minor axis substantially parallel to the axis A—A of the rotor, that is to say in the direction of the displacements of the blade in flap and in pitch, is less than the clearance Jg along the major axis which is perpendicular to the minor axis and transversal to the axis X—X of the blade and extends substantially in the direction of the displacements of the blade in drag. This greater clearance Jg along the major axis results from the oblong shape of the opening 32, the internal lateral wall of which has two flat zones 34 which are opposed and symmetrical at the ends of the minor axis and parallel to the flats 33 of the ring 31. For example, the clearance Jp in the direction of flapping may be 0.5 mm and the clearance Jg in the direction of drag 0.5 mm+1.2 mm, i.e. 1.7 mm, and the ball joint 30 with a surface of tungsten carbide bears flat with a sliding point contact on the internal lateral face, also made of tungsten carbide, of the oblong opening 32.

In addition, the bearing surfaces 6 and 7 of the blade root cuff 5 are each mounted in the corresponding bearing 8 or 9 of the hub with a nominal radial clearance of, for example, 0.5 mm for bearings 8 and 9 having a distance between centers of 65 mm, greater than the distance between centers of the bearings in prior embodiments, the bearing 6 in a radially external position with respect to the rotor axis A—A having a diameter of 47 mm, and the bearing 9, in a radially internal position, having a diameter of 34 mm, these diameters being reduced by comparison with those of the bearings of the analogous embodiments of the state of the art. This increased distance between centers and these reduced diameters of the bearings 8 and 9 make it possible to reduce the mass of the blade root 4, as well as the values of the reactions at the bearings resulting from the uptake of the flapping and drag moments, which makes it possible correspondingly to reduce the value of the frictional moment, and therefore to reduce the transient control loadings. However, the values adopted for the diameters of the bearings remain compatible with the overall space requirement and the procedure for mounting blades 2 on the hub 12.

These radial clearances with which the bearing surfaces 6 and 7 are mounted in the bearings 8 and 9 permit a nominal resultant angular excursion in flap and in drag of ±0.88°, which makes it possible to obtain excursions at the ball joint 30 in the oblong opening 32 so that the ball joint can come to bear against the internal lateral face of the oblong opening 32 on the side of the ends of the minor axis, that is to say against the flat parts 34 or directly close to these, whereas the ball joint 30 cannot come to bear against the internal lateral face of the oblong opening 32 on the side of the ends of its major axis, in the parts referenced as 35 in FIG. 3. The clearances at the bearings 8 and 9 also result in a substantial reduction in the transient control loadings owing to the fact that the ball joints 30 are mounted in the rings 31 with clearance.

Moreover, assuming that in a neutral pitch position at the reference section, the ball joint 30 is centered in the opening 32 and distant from each of the flat zones 34 by a clearance of 0.25 mm, any positive or negative pitch control starting from this initial position, has no impact, over a 0.25 mm beginning of travel, for taking up the clearance, and with no control loading. Then, each increase in the pitch, in terms of absolute value, corresponds to the ball joint 30 being driven by the ring 31, displaced with the control spider 26, this displacement of the ball joint 30 being transmitted by the wrist pin 24 to the pitch lever 23 which rotationally drives the blade about its pitch axis. Therefore, after an initial travel which has no effect, for taking up the clearance or some of the clearance along the minor axis (in the direction of flapping) there is contact between the ball joint 30 and the ring 31 substantially at a flat zone 34. If it is assumed that the pilot has commanded a positive pitch, when he wishes to reduce the pitch whilst keeping a positive pitch, despite a decrease in the control loading, there is continuity of contact between the ball joint 30 and the ring 31 owing to the return moments, particularly the torsional return moment of the torsion arm 18 and "return to neutral" moment of the blade. The control loading remains positive regardless of variations in pitch within this zone, and it is only by changing to negative pitch that the device will change contact zone 34 after once again taking up the clearance Jp along the minor axis, which has no effect in an operating range around the neutral pitch. This phenomenon, linked with the uptake of the play in the direction of flapping, which may a priori be interpreted as an inaccuracy in the pitch control, in fact has no effect or practical impact on the accuracy of flying, because this phenomenon is masked by a neutral point zone specific to ducted anti-torque tail rotors for which the pilot feels no effect on the thrust of the rotor by varying the pitch of the blades over a small angular range on either side of the neutral pitch.

In contrast, in the direction of drag, the greater clearance Jg along the major axis of the oblong opening 32 is such that, bearing in mind the radial clearances at the bearings 8 and 9, any contact of the ball joint 30 with the ring 31 in the zones 35 is avoided, on the sides of the ends of the major axis, in order to avoid detrimental bearing reactions which would increase the frictional loadings at the bearing points. Furthermore, assuming it were possible for the ball joint 30 to bear against a zone 35, a transient loading pointing toward the other zone 35 would be produced on the ball joint 30, which would give a moment of opposite sense to the pitch control moment required, and applied by the control loading to the ball joint 30 and at the end of the pitch lever 23. As a consequence, for one and the same control torque, it would be necessary to deliver a greater control loading to anti the transient loading thus obtained. This is the reason why the clearances at the bearings 8 and 9 are adapted to avoid any contact of the ball joint 30 with the bottom of the oblong opening 32 on the side of the ends of its major axis, this contact being possible only against the flat zones 34 of the opening 32.

In this example, the same advantageous results are obtained for radial clearances at the bearings 8 and 9 lying between approximately 0.45 and 0.55 mm, permitting an angular excursion lying between approximately ±0.8° and ±0.97° of the blade 2.

In order to further reduce the frictional moment about the pitch axis, bearing surfaces 6 and 7 of the cuff 5 are produced covered with a deposited layer of chromium oxide and rotating in bearings 8 and 9 made of a plastic with a low coefficient of friction such as TORLON® (polyamideimide). The hard deposited layers of chromium oxide, giving a protective effect, are additionally covered with a layer of TEFLON EPOXY ® (polytetrafluoroethylene epoxy) lacquer. Thus a dynamic coefficient of friction of the order of 0.15 is obtained.

In the example described, in order to unload the two bearings 8 and 9 by reactions to the control loadings which are of opposite signs to the reactions due to the uptake of the flapping moments, the pitch lever 23 of each blade 2 is both cantilevered with respect to the bearing surfaces 6 and 7 radially inside the radially internal bearing surface 7 and projects from the side of the leading edge of the blade 2. The consequence of positioning the pitch lever 23 on the side of the leading edge is that the control loading is of the same sign as the aerodynamic thrust acting on the blade. The advantage of positioning the cantilevered pitch lever 23 on the outside of the bearings 8 and 9 and on the side of the center of the rotor is that the cantilevered loading of the cuff 5 counters the cantilevered loading induced by the thrust on the blade. As a result, regardless of the value of the pitch, the control loading tends to unload the bearings 8 and 9, whence a decrease in the transient control loading.

In addition, in order to reduce the value of the static loading in the usual pitch range (from the configuration for hovering flight to that of flight in maximum forward speed), the angular setting of the torsion arm 18 is fixed at 8° with respect to the direction of the normal to the plane of the chord of the blade 2 at a point taken at 0.7 R, where R is the radius of the rotor, which corresponds to a specific point on the span of the blade 2, the profile of the main blade section 3 of which is cambered and twisted. Since the total pitch range extends from −25° to +35°, the angular setting of the torsion arm 18 is fixed at 3° more than the middle of the total pitch range at 0.7 R in order to further reduce the torsional stiffness of the bundle in the usual pitch range. This offset of 3° gives rise to a slight increase in the maximum torsional stress, which is not prejudicial to the behavior of the bundle of strips constituting the torsion arm 18. In effect, each torsion arm 18 is made up of a nominal stack of 23 stainless steel strips possibly covered with an anti-fretting deposit, with a thickness of 0.2 mm and a torsion length of approximately 85 mm, this value resulting from a compromise between the stiffness of the torsion arm 18 and the diameter of the hub of the rotor.

It is observed that such a torsion arm 18 includes substantially twice as many strips, each half as thick as those making up the twistable metal bundles on the known counter-torque rotors produced according to patent U.S. Pat. No. 3,594,097.

The reduction in mass inertia about the pitch axis, to which inertia the return to neutral moment is directly proportional, is obtained by optimizing the distribution of the inertias of the whole of the blade 2 in its main blade section 3 just as in its blade root 4, and by adding tuning weights.

The optimization of the distribution of the inertias of the profiled main blade section 3 has been obtained by adopting a setting of the pitch axis at approximately 40% on the chord, from the leading edge of the blade. This setting seems simultaneously favorable to centering of the blade, necessary for reducing the moment of the centrifugal force as far as possible by reducing the distance between the center of gravity of the blade and the pitch axis.

Furthermore, an aerodynamic profile of the OAF type has been adopted, with camber and twist which are progressive along the length of the span of the blade, which has the additional advantage of giving a small nose-down lift moment.

The OAF profile chosen, the setting of the pitch axis and the centering of the blade concur in reducing the mass inertia with respect to the pitch axis, which correspondingly reduces the return to neutral moment, and therefore also the static control loading. In addition, in the examples of FIGS. 1 and 2, in order to further decrease the mass inertia with respect to the pitch axis of the blade, and therefore the static control loadings, drawing benefit from the fact that each torsion arm 18 is no longer directly incorporated into the spar of the profiled part 3 of the corresponding blade 2, as described in U.S. Pat. No. 4,626,173, but connected to the cuff 5 by the pin 19 and the spacer pieces 20 forming a floating retaining pin, these spacer pieces 20 form tuning weights installed directly on the link pin. In order to optimize the efficiency/weight ratio, these spacer pieces 20, and also the pin 19, are given the greatest possible length, bearing in mind the mounting and overall space requirements. This is apparent in FIG. 1 and in the left-hand half-section of FIG. 2.

However, the angular position of the tuning weights made up of the pin 19 and of the spacer pieces 20 is not perfect, since these elements are substantially parallel to the axis A—A of the rotor, whereas there is a preset of 8° for zero torsion of the torsion arm 18, between the pin 19 for retaining this arm 18 in the cuff 5 and the normal to the plane of the chord at the point of the span of the blade 2 corresponding to 0.7 R, and which is the reference point from which the equivalent mass inertia of the entire blade 2 is calculated.

In order to correct this drawback, the blade variant of FIG. 5, of which the cuff is equipped, as in FIG. 7, with two tuning weights according to FIG. 6, is mounted on the rotor of FIGS. 1 and 2, and as represented in the right-hand half-section of FIG. 2.

The blade of FIG. 5 can be distinguished from those of the rotor of FIGS. 1 and 2 solely by its blade root 4a of which the cuff 5a exhibits, in its radially external part directly adjacent to the external bearing surface 6a, a part with flat faces, forming the flats between which the radially external end of the corresponding torsion arm, not represented, is retained with the aid of a pin, also not represented, passing through a transverse bore 36 in the two opposite faces on the side of the suction face and of the pressure face of the blade. For the rest, a radially internal bearing surface 7a, a pitch lever 23a carrying the wrist pin 24a with the ball joint 30a, cantilevered beyond the bearing surface 7a toward the inside (toward the center of the rotor) and projecting on the side of the leading edge of the blade, and a profiled main blade section 3a can be found again, all of which are identical to the corresponding elements of the blade 2. Small holes 37 are made at various points on the cuff 5a, in order to fasten possible weights for individual balancing of the blades. The position of these weights also concurs in enhancing the "tuning weights" effect.

The tuning weight 38 of FIG. 6 comprises a cylindrical bushing 39 fitting into the bore 36, and secured at one end to a collar 40 applied against a corresponding face of the cuff 5a, and the periphery of which exhibits, on a side intended to be applied against the radially internal face of the external bearing surface 6a, two flats 41 at the ends of a notch and forming polarizing keys for fitting the tuning weight 38 onto the cuff 5a, as represented in FIG. 7. The collar 40 of the tuning weight 38 is of a single metal piece not only with the bushing 39 but also, on the opposite side, with a solid tongue 42, having the overall shape of a relatively thick portion of cone frustum, forming a counterweight which is curved and inclined to the axis of the bushing 39 and of the central opening of the collar 40, which are intended to receive the pin for fastening the tuning weight 38 onto the cuff 5a, as in the preceding example. The position of the tongue 42 with respect to the polarizing keys 41 and its inclination to the axis of the bushing 39 are such that, when the tuning weight 38 is mounted on the cuff 5a (see FIG. 7), the tongue 42 is inclined toward the leading edge and toward the upper side of the suction face of the blade, when the weight 38 is fastened to the face of the cuff 5a on the side of the suction face. In contrast, when the tuning weight 38 is fastened to the face of the cuff 5a pointing to the side of the pressure face of the blade, the tongue 42 of the tuning weight 38 is inclined toward the trailing edge and toward the underside of the pressure face of the blade, as represented in FIG. 7. The cuff 5a is preferably equipped with two tuning weights 38, one at each end of the transverse bore 36 in the cuff 5a, so that the two tongues 42 give a favorable distribution of mass inertia about an axis which is inclined so that it compensates for the angular preset of the torsion arm 18.

FIG. 8 represents partially and in section another rotor example, of which only the essential differences by comparison with that of the preceding figures will be described hereinbelow, and of which the similar elements will be identified by the same references attributed with a prime symbol.

The torsion arm 18' of each blade 2' is no longer a bundle of strips belonging to the corresponding blade 2' but a radial arm of a star-shaped bundle including as many arms as the rotor has blades, the center of the star being flat, annular and set in at 21' between two central annular radial flanges 22' of the hub 12', the star-shaped bundle thus being similar to the one described in Patent U.S. Pat. No. 3,594,097.

Another difference is that in FIG. 8, the wrist pin 24' carrying the ball joint 30' is screw-fastened onto the corresponding tab 25' of the control spider 26', whereas the ball joint 30', identical to the ball joint 30 in the preceding example, is received with the necessary clearances in the oblong opening in a ring 31', identical to the ring 31 of the preceding example, and mounted in a housing in the pitch lever 23', also cantilevered inside the internal bearing surface 7' of the blade cuff 5' and projecting from the side of the leading edge of the blade 2'. In this example, the ball joint 30', for example made of steel, is therefore carried by the control tab 25', whereas the ring 31', for example made of plastic with a low coefficient of friction such as TORLON® is carried by the pitch lever 23'. Since the mass of the ball joint 30' and of the wrist pin 24' is greater than the mass of the ring 31', fastening the ball joint and the wrist pin to the pitch lever of the blade, as in FIGS. 1 and 2, has the effect of increasing the rotating mass and the mass inertia of the blade, and therefore the return to neutral moment. It is therefore preferable to adopt the mounting method of FIG. 8, fastening the weighty elements (ball joint 30' and wrist pin 24') to the spider 26', and the ring 31', of lesser weight, to the blade 2'. Thus the return to neutral moment and therefore also the control loadings are reduced. However, this mounting method is possible only if the number of blades of the rotor is sufficiently low, for example 8 blades, to liberate enough space in the circumferential direction to locate thereat pitch levers 23' of sufficient size to accommodate the rings 31', and without the risk of interference with other components of the rotor when the levers 23' rotate.

Thus rotors are produced which can be controlled with low static and transient control loadings, of the order of 1/10 to 1/12 of those necessary in the similar embodiments of the state of the art, and using torsion arms of which the torsional moment is of the order of 1/8 of those of prior rotors.

It is thus possible to do away with the cost of providing a servocontrol unit and the associated hydraulic circuit in the collective pitch control chain of the blades of a helicopter ducted anti-torque rotor.

We claim:

1. A variable-pitch multi-blade rotor, for a helicopter ducted anti-torque device, comprising:

a rotor shaft, mounted so that it rotates about an axis of the rotor, a hub, rotationally secured to the rotor shaft, blades, each of which is connected to the hub by a footing part comprising at least one flexible arm which can be twisted about the longitudinal pitch change axis of the blade, and which is partially housed in a blade root cuff, the cuff exhibiting two coaxial bearing surfaces spaced apart along the axis of the blade via which each arm is mounted so that it swivels about the axis of the blade in two bearings of the hub as well as a pitch lever, which is off-centered with respect to the axis of the blade, and a spider for collective control of the pitch of the blades which is rotationally driven with the hub and can be given a translational movement along the axis of the rotor by means of a control rod, the spider exhibiting, for each blade, a pitch control tab extending substantially along the axis of the rotor and articulated to the pitch lever of the corresponding blade by means of a wrist pin with ball joint, so that any axial displacement of the spider with respect to the hub gives rise, via the action of the tab on the pitch lever, to a rotation of the blade about its pitch axis, wherein the ball joint is carried by one of the two elements which are the lever and the tab and is engaged in an oblong opening in a ring carried by the other of the two elements with clearance along each of the major and minor axes of the oblong opening, the clearance along the minor axis substantially parallel to the axis of the rotor being less than the clearance along the major axis perpendicular to the minor axis and transverse to the axis of the blade, and each bearing surface of the cuff is mounted in the corresponding bearing of the hub with a clearance allowing the ball joint to bear against the internal lateral face of the oblong opening on the side of the ends of the minor axis but such that the ball joint cannot come to bear against the internal lateral face of the oblong opening on the side of the ends of the major axis.

2. The rotor as claimed in claim 1, wherein, for each blade, the ball joint comes to bear flat with sliding point contact against the internal lateral face of the corresponding oblong opening.

3. The rotor as claimed in claim 1, wherein the oblong opening exhibits two opposed flats parallel to its major axis and which are symmetric with respect to its center, and is formed in a ring inserted and fastened into a housing in the element which carries it and held by a shoulder against an edge of the said housing, and on which shoulder there are formed two flats parallel to the major axis of the oblong opening.

4. The rotor as claimed in claim 1, wherein, for each blade, the cuff carries the pitch lever radially on the outside of the bearing surfaces toward the axis of the rotor and projecting toward the leading edge of the blade.

5. The rotor as claimed in claim 1, wherein, for each blade, the cuff carries the pitch lever radially on the outside and close to the bearing surface in a radially external position with respect to the axis of the rotor, and projecting toward the trailing edge of the blade.

6. The rotor as claimed in claim 1, wherein, for each blade, the pitch lever carried by the cuff between its two bearing surfaces, and closer to the radially internal bearing surface with respect to the axis of the rotor than to the other bearing surface, projects toward the leading edge of the blade.

7. The rotor as claimed in claim 1, wherein, for each blade, the pitch lever carried by the cuff between its two bearing surfaces and closer to the radially external bearing surface with respect to the axis of the rotor than to the other bearing surface, projects toward the trailing edge of the blade.

8. The rotor as claimed in claim 1, wherein each twistable and flexible arm is linked to the corresponding blade, while being held in the cuff on the side of its radially external end with respect to the axis of the rotor, by at least one fastening pin which can float with respect to the cuff, in a direction substantially parallel to the axis of the rotor and extending substantially parallel to the axis of the rotor so as to give a tuning-weight effect.

9. The rotor as claimed in claim 1, wherein each twistable and flexible arm is linked to the corresponding blade, being held in the cuff on the side of its radially external end with respect to the axis of the rotor, by at least one fastening pin which can float with respect to the cuff, in a direction substantially parallel to the axis of the rotor and itself substantially parallel to the axis of the rotor and which simultaneously fastens at least one tuning weight to the cuff.

10. The rotor as claimed in claim 9, wherein at least one tuning weight comprises a bushing engaging in a transverse bore of the cuff and secured to a collar bearing against a lateral face of the cuff and exhibiting at least one polarizing key for positioning it on the cuff, the collar bearing, on the opposite side from the bushing, a counterweight which is substantially inclined toward the leading edge and toward the upper side of the suction face or toward the trailing edge and toward the underside of the pressure face of the blade, depending on whether the tuning weight is fastened respectively on the suction face side or on the pressure face side of the blade.

11. The rotor as claimed in claim 1, wherein, for each blade, the corresponding ball joint carried by the pitch lever and the corresponding ring carried in the control tab are made of tungsten carbide.

12. The rotor as claimed in claim 1, wherein, for each blade, the corresponding ball joint carried by the control tab is made of steel, and the corresponding ring carried by the pitch lever is made of plastic material having a low friction coefficient.

* * * * *